United States Patent
Chakra et al.

(10) Patent No.: US 10,108,518 B2
(45) Date of Patent: Oct. 23, 2018

(54) DEVICE INTERFERENCE DETECTION AND REMEDIATION

(71) Applicant: International Business Machines Corporation, Armonk, NY (US)

(72) Inventors: Al Chakra, Apex, NC (US); Jonathan Dunne, Waterford (IE); Liam Harpur, Dublin (IE); Eduardo A. Patrocinio, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 15/092,701

(22) Filed: Apr. 7, 2016

(65) Prior Publication Data

US 2017/0293521 A1    Oct. 12, 2017

(51) Int. Cl.
*G06F 11/30* (2006.01)
*G06F 11/07* (2006.01)
*G06F 11/22* (2006.01)
*G06F 13/42* (2006.01)

(52) U.S. Cl.
CPC ...... *G06F 11/3041* (2013.01); *G06F 11/0793* (2013.01); *G06F 11/221* (2013.01); *G06F 11/2221* (2013.01); *G06F 11/3027* (2013.01); *G06F 11/3051* (2013.01); *G06F 11/3089* (2013.01); *G06F 13/4282* (2013.01)

(58) Field of Classification Search
CPC ............ G06F 11/0793; G06F 11/221; G06F 11/2221; G06F 11/3027; G06F 11/3051; G06F 13/4282
See application file for complete search history.

(56) References Cited

U.S. PATENT DOCUMENTS

| | | | | |
|---|---|---|---|---|
| 6,038,621 | A | * | 3/2000 | Gale ............... G06F 3/1293 709/212 |
| 6,618,776 | B1 | | 9/2003 | Zimmermann et al. |
| 7,336,602 | B2 | * | 2/2008 | Silvester ............ H04L 1/0001 370/216 |

(Continued)

FOREIGN PATENT DOCUMENTS

EP    1460803 B1    9/2012

OTHER PUBLICATIONS

Wireless Product Not Working Properly When Also Using a USB 3.0 Device . Aug. 31, 2014 [retrieved on Dec. 2, 2017]. Retrieved from the Internet: <URL: http://support.logitech.com/en_gb/article/38032>.*

(Continued)

*Primary Examiner* — Paul Contino
(74) *Attorney, Agent, or Firm* — Cantor Colburn LLP (57) ABSTRACT

A computer-implemented method includes calculating a first efficiency of a first device connected to a host system when a second device is not connected to the host system. Connection of the second device to the host system is detected. The method further includes calculating a second efficiency of the first device when the second device is connected to the host system. An interference quotient of the first device is calculated, by a computer processor, based on the first efficiency and the second efficiency. A user is warned of interference between the first device and the second device, responsive to the interference quotient being in an unacceptable range.

18 Claims, 5 Drawing Sheets

(56) References Cited

U.S. PATENT DOCUMENTS

| | | | | |
|---|---|---|---|---|
| 9,529,398 B2* | 12/2016 | Urbina | ............... | G06F 1/26 |
| 2004/0230547 A1* | 11/2004 | Wookey | ............... | G06F 11/008 |
| | | | | 706/47 |
| 2005/0033876 A1 | 2/2005 | Hanes et al. | | |
| 2008/0147896 A1* | 6/2008 | Soukko | ............... | G06F 9/5016 |
| | | | | 710/8 |
| 2008/0294423 A1* | 11/2008 | Castellani | ............... | G06F 11/0733 |
| | | | | 704/4 |
| 2015/0052122 A1* | 2/2015 | Landry | ............... | G06F 11/0706 |
| | | | | 707/723 |
| 2015/0134863 A1 | 5/2015 | Hsieh | | |
| 2016/0139974 A1* | 5/2016 | Herb | ............... | G06F 11/079 |
| | | | | 714/37 |
| 2016/0300190 A1* | 10/2016 | Moran | ............... | G06Q 10/1053 |

OTHER PUBLICATIONS

Map and troubleshoot your USB ports with Microsoft USB View. Apr. 12, 2012 [retrieved on Dec. 2, 2017]. Retrieved from the Internet: <URL:https://www.techrepublic.com/blog/windows-and-office/map-and-troubleshoot-your-usb-ports-with-microsoft-usb-view/>.*

* cited by examiner

Fig. 4

DEVICE INTERFERENCE DETECTION AND REMEDIATION

BACKGROUND

Embodiments of the present invention relate to device interference and, more specifically, to device interference detection and remediation.

Universal serial bus (USB) has become a standard for connecting peripheral devices to computers, and as a result, USB devices are more common than ever. When connecting a device to a business or home computer, that device will likely be connected by way of USB. In some cases, a user may have four to eight USB devices used with a single computer.

A resulting issue of connecting multiple devices in close proximity is interference. This interference can be caused by insufficient shielding of USB devices, which can lead to unintended interactions with nearby other USB devices. For example, a computer may have two USB devices connected and working efficiently with the computer, but when a third USB device is connected, that third connection may cause interference among the three USB devices, which may result in unexpected behavior or inefficiencies. In the case of medical devices, the above issue is of even greater concern. For example, if a physician has critical data files with medical records stored on a storage device connected via USB, that storage device may behave erratically in the presence of one or more other USB devices.

SUMMARY

According to an embodiment of this disclosure, a computer-implemented method includes calculating a first efficiency of a first device connected to a host system when a second device is not connected to the host system. Connection of the second device to the host system is detected. The method further includes calculating a second efficiency of the first device when the second device is connected to the host system. An interference quotient of the first device is calculated, by a computer processor, based on the first efficiency and the second efficiency. A user is warned of interference between the first device and the second device, responsive to the interference quotient being in an unacceptable range.

In another embodiment, a system includes a memory having computer readable instructions and one or more processors for executing the computer readable instructions. The computer readable instructions include calculating a first efficiency of a first device connected to a host system when a second device is not connected to the host system. Connection of the second device to the host system is detected. The computer readable instructions further include calculating a second efficiency of the first device when the second device is connected to the host system. An interference quotient of the first device is calculated, based on the first efficiency and the second efficiency. A user is warned of interference between the first device and the second device, responsive to the interference quotient being in an unacceptable range.

In yet another embodiment, a computer program product for detecting interference includes a computer readable storage medium having program instructions embodied therewith. The program instructions are executable by a processor to cause the processor to perform a method. The method includes calculating a first efficiency of a first device connected to a host system when a second device is not connected to the host system. Connection of the second device to the host system is detected. The method further includes calculating a second efficiency of the first device when the second device is connected to the host system. An interference quotient of the first device is calculated, based on the first efficiency and the second efficiency. A user is warned of interference between the first device and the second device, responsive to the interference quotient being in an unacceptable range.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Given the possibility of interference between universal serial bus (USB) devices, various embodiments of a detection system described herein may detect interference and take action based on such detection. In some embodiments, the detection system may perform one or more of the following tasks: monitor connections of USB devices to a host; monitor the reliability and performance of each such USB device; analyze performance data for each USB device to determine interference quotients; report the interference quotients to a knowledgebase; and warn a user of the risk of interference from connected USB devices, based on the interference quotients of the USB devices.

Figure 1:
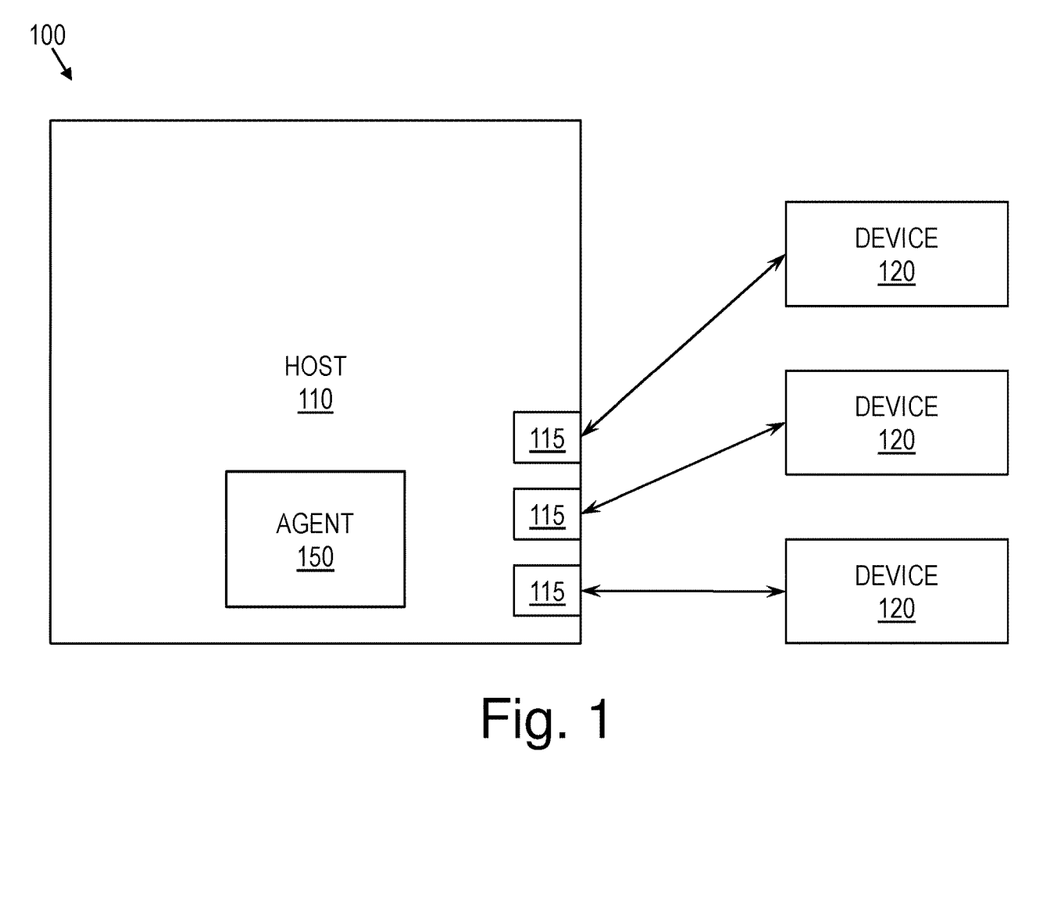
FIG. 1 is a block diagram of a detection system, according to some embodiments of this disclosure.

FIG. 1 is a block diagram of a detection system 100 applicable to a host 110, according to some embodiments of this disclosure. The host 110, or host system, may have one or more USB ports 115, each configured to receive a device 120. Each device 120 may be a USB device, connectable to the host 110 by way of a USB port 115 of the host 110. For example, and not by way of limitation, a device 120 may be an external hard drive, an optical drive, a printer, a keyboard, a mouse, a smartphone, or various other devices. Through connection by way of a USB port 115, each device 120 may communicate with the host 110. In some embodiments, one or multiple devices 120 may be connected to the host 110 at a given time.

The detection system 100 may include a detection agent 150 in communication with the host 110, such as by being installed on the host 110. For instance, the detection agent 150 may be embodied in hardware, software, or a combination of both, and activities of the agent 150 may be executed by a hardware computer processor on behalf of the detection agent 150. Operations of the detection system 100 performed at the host 110 may be performed or managed by the detection agent 150.

The host 110 may be configured to run the detection agent 150, so as to enable operation of the detection system 100. In some embodiments, the host 110 may be a computer system. In some embodiments, however, the host 110 may be another device 120, such as a USB device, behaving as a peer to the one or more devices 120 connected by way of the one or more USB ports 115. Thus, detection and remediation of interference may occur through peer devices 110, according to some embodiments.

In some embodiments, the detection system 100 may monitor devices 120 connected to the host 110 and maintain performance data for each device 120. This performance data may represent the performance of the associated device 120 at various points in time. For instance, the performance data for a first device may include data points for that device, with each data point representing a point in time. Further, each data point may include information about the performance of the first device at the corresponding time of the data point, as well as information about other devices 120 connected to the host 110 at that corresponding time.

For example, Table 1 below illustrates an example table representing performance data related to a wireless mouse, which may be a first device 120 connected by way of a USB wireless adapter.

Further, in a table representing performance data for the first device 120, there may be additional columns for additional connected devices 120, where each additional connected device 120 may be represented by corresponding Device ID, Device Name, and Interference Quotient fields.

While the above table is only an example for illustrative purposes, it will be understood that the performance data may describe, at various points in time, the efficiency of the associated device 120 as well as indications of what other devices 120 are connected to the host 110. Calculation of efficiency may vary based on the type of device 120 in question. For instance, if the first device 120 is a storage device or an optical device, the efficiency may be based on the speed of reading or writing data. For another instance, if the first device 120 is a printer, the efficiency may be based on the speed of sending data to the printer for printing.

The interference quotient may be calculated in various ways. In some embodiments, the interference quotient of a first device 120 with respect to a second device 120 may be based on a comparison of the first device's efficiency without connection of the second device 120 versus with connection of the second device 120. For example, and not by way of limitation, the interference quotient of a first device 120 may be a slope or the intercept of a regression model, such as a linear regression model, of the efficiency of the device 120. For instance, the detection system 100 may represent the performance of a first device 120 by a graph, with the efficiency on one axis (e.g., the horizontal axis) and the connection status of a second device 120 on the other axis (e.g., the vertical axis). The connection status may be represented by a value of 0, indicating a lack of connection and 1, indicating a connection.

| Date | Time | X Coordinate | Y-Coordinate | Efficiency | Device ID 1 | Device Name 1 | Interference Quotient 1 |
| --- | --- | --- | --- | --- | --- | --- | --- |
| Nov. 23, 2014 | 19:01:42 | 230 | 300 | 95% | null | null | null |
| Nov. 23, 2014 | 19:01:47 | 220 | 400 | 95% | null | null | null |
| Nov. 23, 2014 | 19:03:17 | 450 | 300 | 55% | 231:122:111 | Device 1 | 0.45 |
| Nov. 23, 2014 | 19:03:20 | 480 | 310 | 55% | 231:122:111 | Device 1 | 0.45 |

In the above table, each row represents a data point corresponding to a specific time, where the time is a combination of the Date and Time fields. At that corresponding time, the cursor directed by movement of the mouse is at the position indicated by the X Coordinate and Y Coordinate fields. In this case, Efficiency may refer pixel movement efficiency and may be calculated by taking the time the cursor was expected to take in arriving at that position after the mouse was moved, divided by the time the cursor actually took to arrive that the position. Thus, in this example, Efficiency may be a reflection of the cursor's sluggishness, and a high value may indicate better efficiency as compared to a lower value.

In the table, the Device ID 1 field may include an identifier of second device 120, if any, that is connected to the host 110 in addition to the first device 120 associated with the table. The Device Name 1 field may indicate a name of that second device 120, and the Interference Quotient 1 field may indicate an interference quotient of the first device 120 with respect to the second device 120. The interference quotient may describe a level of interference calculated based on connection of the second device 120 connected. Calculation of this interference quotient is described below.

Figure 2:
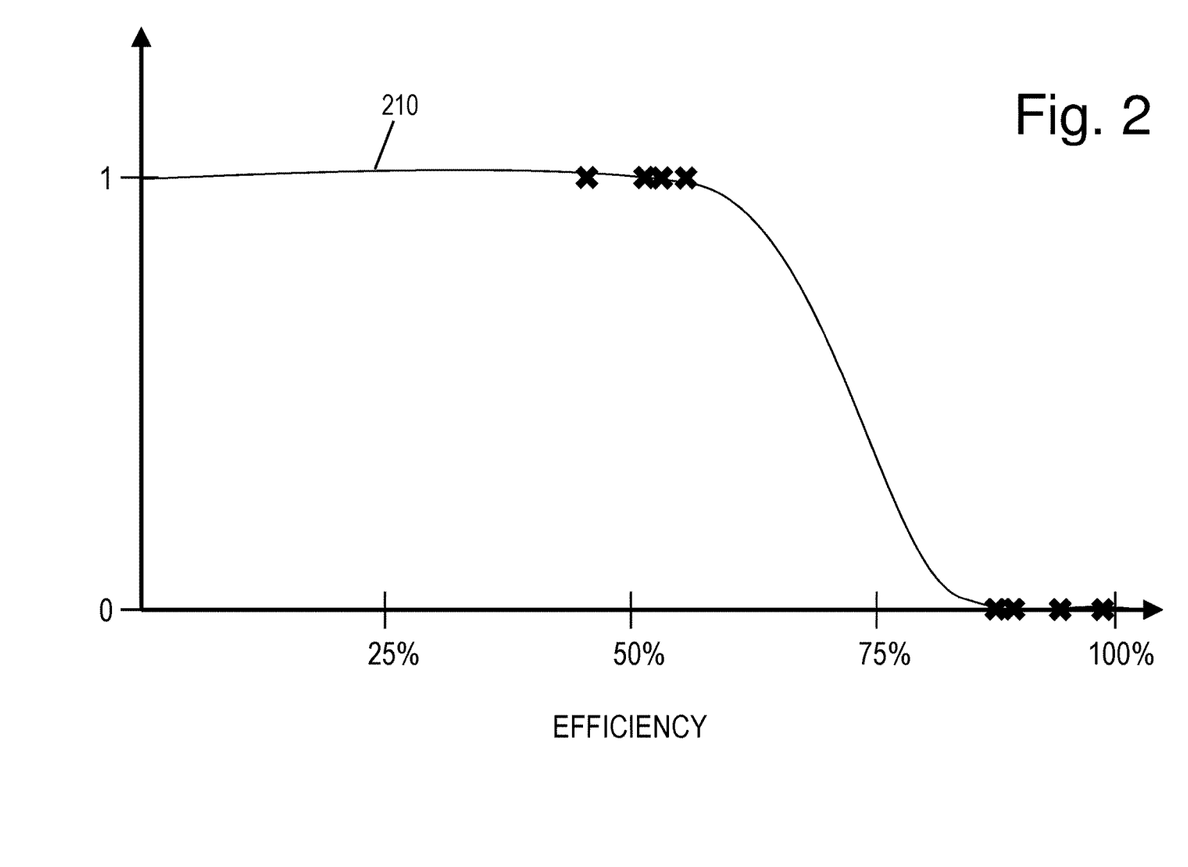
FIG. 2 is an example graph for determining an interference quotient, according to some embodiments of this disclosure.

FIG. 2 illustrates an example of such a graph, according to some embodiments of this disclosure. The example graph of FIG. 2 represents the connection status of a second device 120 versus the efficiency of a first device 120, and thus this graph may be used to determine the interference quotient of the first device 120 with respect to the second device 120. In other words, the horizontal axis represents the efficiency of the first device 120, while the vertical axis represents whether the second device 120 known as Device 2 is attached to the host 110 along with the first device 120.

At the value of 0 on the vertical axis are various points representing the various efficiency values of the first device 120 that were calculated based on data points for when Device 2 was not attached. At the value of 1 on the vertical axis are various points represent the various efficiency values of the first device 120 that were calculated based on data points for when Device 2 was attached. Using known curve-fitting techniques, a curve 210 may be fit to these points, and a characteristic or parameter of that curve 210, such as the absolute value of the slope, may be used as the interference quotient or as a basis for calculating the interference quotient. Further, in some embodiments, the interference quotient may be normalized to be in the range of [0, 1].

Using this method of calculating the interference quotient, an interference quotient of 0 may reflect no interference while higher interference quotients may represent higher degrees of interference. However, the interference quotient may be calculated in other ways, and either a higher interference quotient or a lower interference quotient can represent more interference rather than less.

In some cases, the interference quotient of a first device 120 with respect to a second device 120 may be deemed unacceptable. In some embodiments, unacceptability may be determined based on whether interference quotient is in an unacceptable range (e.g., greater than 0.5), is above a threshold, or is below a threshold. When the interference quotient is unacceptable, the detection system 100 may take action to reduce the amount of interference. This action may include, for example, warning a user of existing interference or suggesting that the user reconfigures the devices 120, such as by disconnecting them from the host 110 or repositioning them.

In some embodiments, the detection system 100 may use colors to warn of interference, where each color may correspond to a range of interference quotients. For example, a first color (e.g., green) may correspond to a first range of interference quotients classified as low, a second color (e.g., yellow) may correspond to a second range of interference quotients classified as medium, and a third color (e.g., red) may correspond to a third range of interference quotients classified as high. These colors may be used in various ways, so as to alert the user of potential interference. For example, the detection system 100 may cause a dialog box to be displayed on a monitor of the host 110, where the dialog box has a background color corresponding to the range of the interference quotient of the first device 120 with respect to the second device 120. For another example, each USB port 115 may be outlined by a light capable of lighting up in multiple colors. In this case, the light of a USB port 115 into which the first device 120 is plugged may light up in the color corresponding to the range of the interference quotient of that first device 120.

In some embodiments, the detection system 100 may select one or more remedial actions to be performed, in addition to or alternatively to the above use of colors. The detection system 100 may maintain remedial data, which may include an action table of available remedial actions. The remedial data may also include information about one or more of: which remedial actions have been tried for each interference quotient of each device 120 when those remedial actions were tried, and the success of those remedial actions. Further, in some embodiments, the action table of remedial actions may be ordered, or ranked, based on their extremeness.

For example, and not by way of limitation, the available remedial actions may include moving the first device 120 to a different USB port 115, moving the second device 120 (i.e., the interfering device 120) to a different USB port 115, disconnecting the first device 120, disconnecting the second device 120, adding a USB extension cable to the first device 120, or adding an extension cable to the second device 120. Given these available remedial actions, disconnecting the first device 120 may be considered the most extreme action and may thus be last in the order, or ranked lowest, based on extremeness.

Upon detecting that a first device 120 has an unacceptable interference quotient with respect to a second device 120, the detection system 100 may select the least extreme remedial action available that has not yet been tried for this particular interference quotient, or that has not been tried within predetermined period of time. After making the selection, detection system 100 may suggest the user take this action, such as by providing the selected remedial action to the user in the form of a dialog box displayed on the monitor.

The detection system 100 may then receive some indication that the remedial action was performed. This indication may be a detection that the remedial action was taken (e.g., detecting that the first device was disconnected and then reconnected to a different USB port 115), or it may be receipt of the user's confirmation that the remedial action was taken. Upon receiving the indication, the detection system 100 may indicate in its remedial data that the selected remedial action has been tried for the first device's interference quotient with respect to the second device 120. The detection system 100 may then return to monitoring its connected devices 120 until one or more of the devices 120 is again deemed to have an unacceptable interference quotient. If the first device's interference quotient with respect to the second device 120 is later deemed to be unacceptable again, then the detection system 100 may select from the remedial actions the least extreme action that has not yet been tried.

If the first device's interference quotient with respect to the second device 120 remains acceptable for a predetermined period after the remedial action was taken, the detection system 100 may deem the remedial action successful, and may update the remedial data with the success. On the other hand, if the first device's interference quotient with respect to second device 120 becomes unacceptable again within the predetermined period after the remedial action was taken, the detection system 100 may deem the remedial action unsuccessful, and may update the remedial data with the success.

Figure 3:
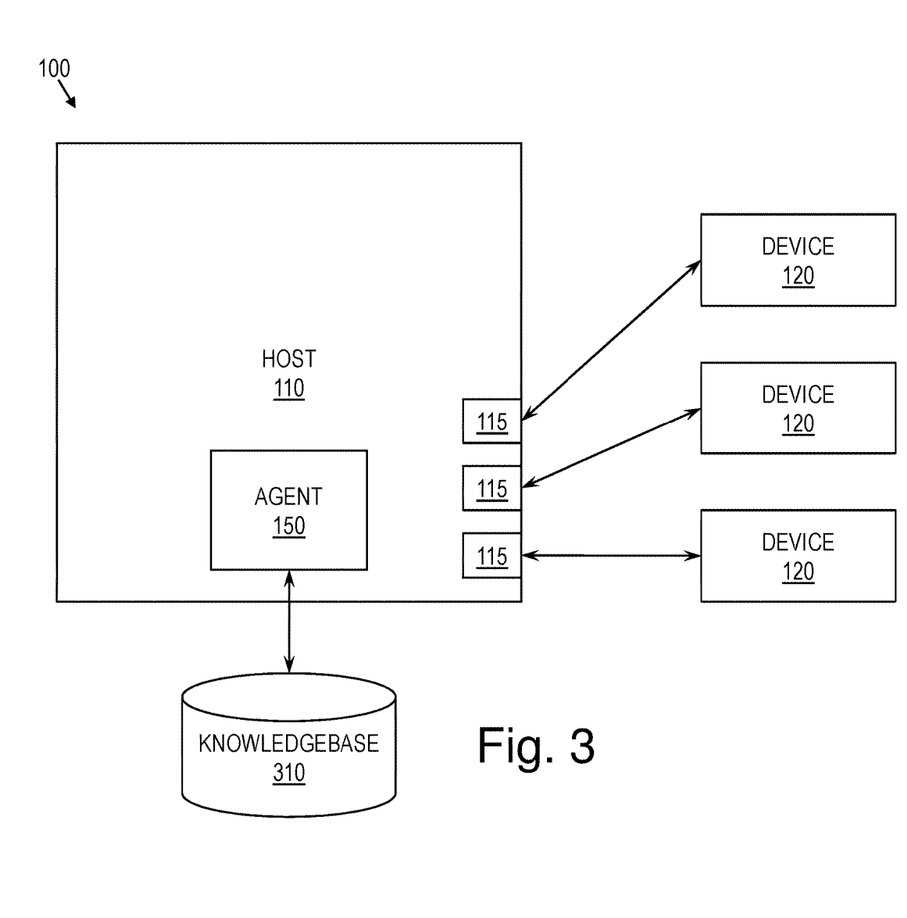
FIG. 3 is a block diagram of the detection system utilizing a knowledgebase, according to some embodiments of this disclosure.

In some embodiments, the detection system 100 may use or contribute to a global knowledgebase, which may describe historical interference issues encountered, as well as remedial actions taken and indications of the success or failure of these actions. FIG. 3 is a block diagram of the detection system 100 utilizing a knowledgebase 310 for this purpose, according to some embodiments of this disclosure.

As shown, FIG. 3 illustrates the same components illustrated in FIG. 1, but additionally includes the knowledgebase 310. The knowledgebase 310 may, for example, reside on a remote server accessible by the host 110 and accessible by one or more other hosts 110 at remote locations. The detection system 100 may notify the knowledgebase 310 of its experiences with the devices 120 and of actions taken and the effects of those actions toward reducing interference. Remote instances of the detection system 100 at other hosts 110 may do likewise. As such, the knowledgebase 310 may contain information useful to the host 110 regarding other hosts' experiences with devices 120.

Specifically, for instance, the knowledgebase 310 may maintain remedial data for multiple hosts, including indications of which remedial actions have been tried in attempts to affect which interference quotients. Thus, when detecting an unacceptable interference quotient of a first device 120 with respect to a second device 120, the detection system 100 may consult the knowledgebase 310 before taking action. The knowledgebase 310 may indicate that certain remedial actions have been unsuccessful in remote hosts 110, and thus, the detection system 100 may skip those remedial actions when determining which remedial action to select and suggest to the user.

Figure 4:
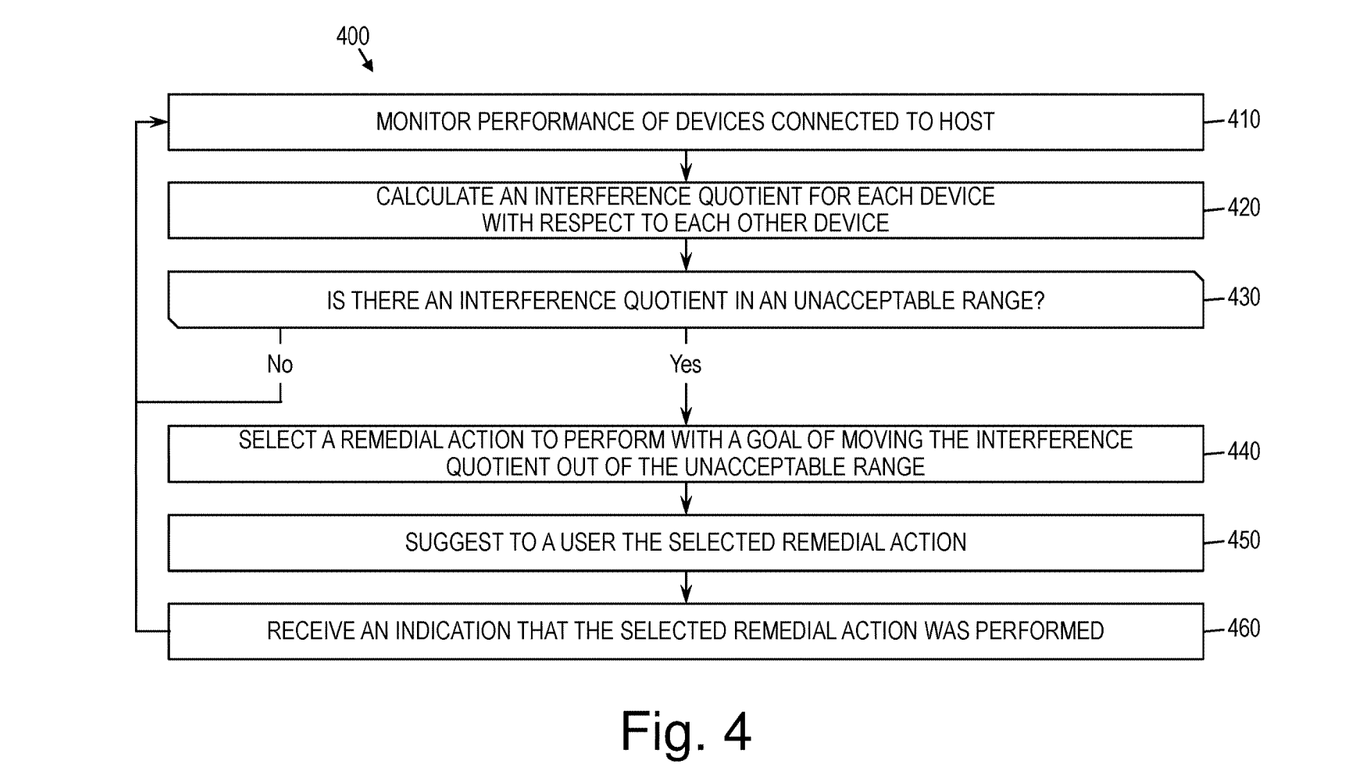
FIG. 4 is a flow diagram of a method for detecting interference, according to some embodiments of this disclosure.

FIG. 4 is a flow diagram of a method 400 for detecting interference, according to some embodiments of this disclosure. As shown, at block 410, the detection system 100 may monitor the performance of one or more devices 120 connected to the host 110. At block 420, the detection system 100 may calculate an interference quotient for each device 120 with respect to each other device 120, and may record performance data of the one or more devices 120 connected to a host 110. For each of the one or more devices 120, the performance data may include the interference quotients calculated for the device 120.

At decision block 430, the detection system 100 may determine whether any of the one or more devices 120 has an interference quotient in an unacceptable range. For example, and not by way of limitation, an interference quotient above a predefined interference threshold may be deemed to be in an unacceptable range. If no interference quotient is in an acceptable range, such that all interference quotients are within an acceptable range, the method 400 may return to block 410.

However, if an interference quotient of a first device 120 with respect to a second device 120 is in an unacceptable range, then at block 440, the detection system 100 may select a remedial action to perform with a goal of moving that interference quotient out of the unacceptable range and into an acceptable range. In some embodiments, selecting a remedial action may include selecting a next untried remedial action from an action table of ordered remedial actions. At block 450, the detection system 100 may suggest the selected remedial action to a user. At block 460, the detection system 100 may receive an indication that the selected remedial action was performed. The method 400 may then return to block 410, where the detection system 100 may continue to monitor the connected devices 120.

Figure 5:
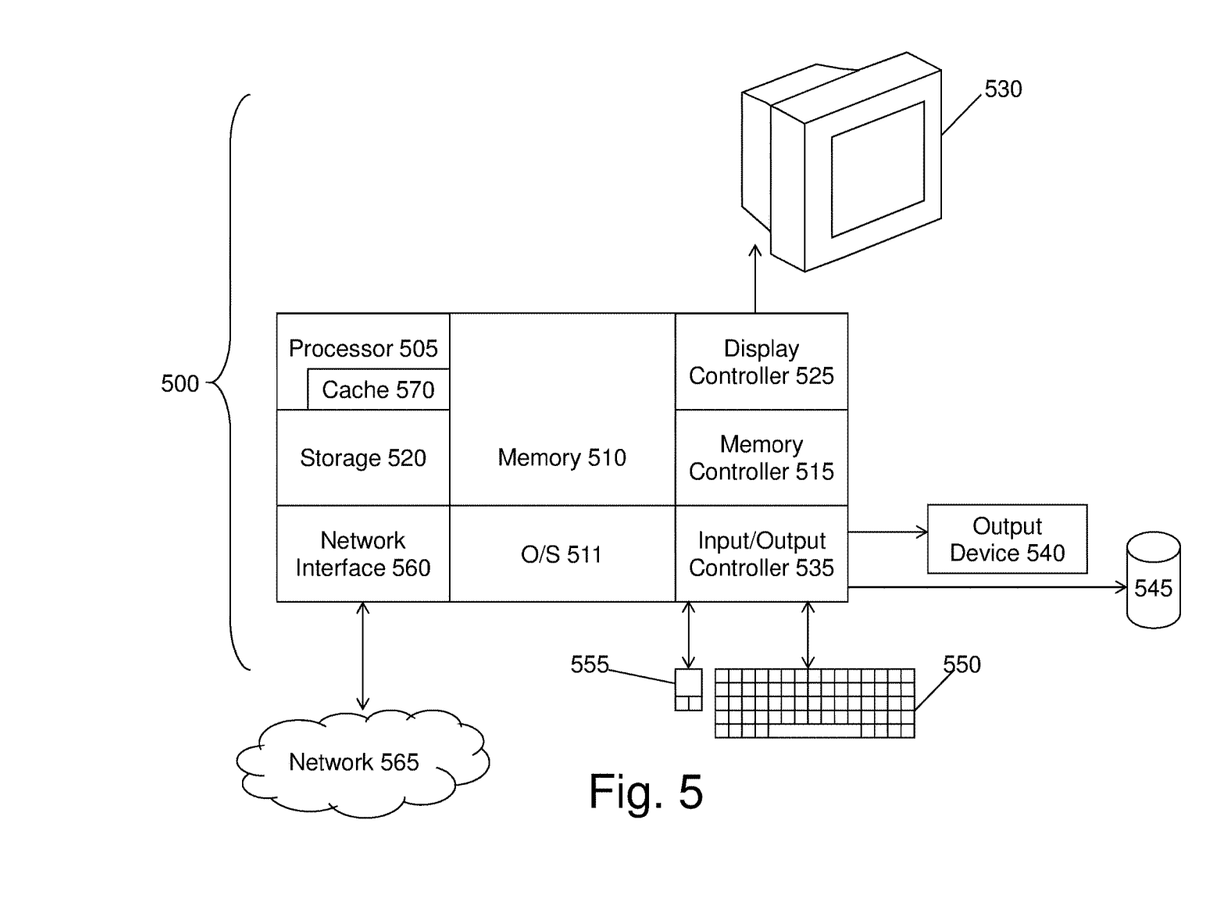
FIG. 5 is a block diagram of a computer system for implementing some or all aspects of the detection system, according to some embodiments of this disclosure.

FIG. 5 illustrates a block diagram of a computer system 500 for use in implementing a detection system 100 or method according to some embodiments. The detection systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For instance, the host 110 may be a computer system 500, and the detection system 100 may operate by way of the detection agent 150 running on that computer system 500.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the detection systems 100 methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Detection systems 100 and methods according to this disclosure may be embodied, in whole or in part, in computer program products or in computer systems 500, such as that illustrated in FIG. 5.

Technical effects and benefits of some embodiments include the ability to detect and act on interference between USB devices 120, in the aim of reducing such interference where it causes unacceptable behavior. In some embodiments, this is performed by calculating an interference quotient for each device 120 and performing one or more activities, such as moving or disconnecting a device 120, in response to an interference quotient being in an unacceptable range.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting first performance data of a first USB-connected external device over time, wherein the first USB-connected external device is external to the host system;
    calculating a first efficiency of the first USB-connected external device connected to the host system, based on the first performance data of the first USB-connected external device when a second USB-connected external device is not connected to the host system, wherein the first efficiency is distinct from the first performance data;
    detecting connection of the second USB-connected external device to the host system while the first USB-connected external device is connected to the host system, wherein the second USB-connected external device is external to the host system;
    detecting second performance data of the first USB-connected external device over time when both the first USB-connected external device and the second USB-connected external device are connected to the host system;
    calculating a second efficiency of the first USB-connected external device, based on the second performance data of the first USB-connected external device when both the first USB-connected external device the second USB-connected external device are connected to the host system, wherein the second efficiency is distinct from the second performance data;
    calculating, by a computer processor, an interference quotient of the first USB-connected external device based on the first efficiency and the second efficiency; and
    remediating interference between the first USB-connected external device and the second USB-connected external device, responsive to the interference quotient being in an unacceptable range.

2. The computer-implemented method of claim 1, wherein the remediating the interference comprises suggesting a first remedial action to a user, the first remedial action being directed to change the interference quotient.

3. The computer-implemented method of claim 2, further comprising:
    maintaining an action table of remedial actions in rank order; and
    identifying the first remedial action as a highest-ranked remedial action in the action table that has not yet been tried to change the interference quotient; wherein the remediating the interference comprises the first remedial action to a user, responsive to the first remedial action being the highest-ranked remedial action that has not yet been tried to change the interference quotient.

4. The computer-implemented method of claim 3, further comprising consulting a remote knowledgebase to determine which of the remedial actions in the action table have been tried to change the interference quotient.

5. The computer-implemented method of claim 2, wherein the first remedial action comprises at least one of: moving the first USB-connected external device, moving the second device, connecting the first USB-connected external device to an extension cable, connecting the second device to an extension cable, disconnecting the first USB-connected external device, and disconnecting the second device.

6. The computer-implemented method of claim 1, wherein calculating the interference quotient of the first USB-connected external device based on the first efficiency and the second efficiency comprises:
    fitting a curve to a plurality of points representing efficiency of the first USB-connected external device when the second device is not connected to the host system and when the second device is connected to the host system; and
    determining the interference quotient based on a characteristic of the curve.

7. A system comprising:
    a memory having computer readable instructions; and
    one or more processors for executing the computer readable instructions, the computer readable instructions comprising:
        detecting first performance data of a first USB-connected external device over time, wherein the first USB-connected external device is external to the host system;
        calculating a first efficiency of the first USB-connected external device connected to the host system, based on the first performance data of the first USB-connected external device when a second USB-connected external device is not connected to the host system, wherein the first efficiency is distinct from the first performance data;
detecting connection of the second USB-connected external device to the host system while the first USB-connected external device is connected to the host system, wherein the second USB-connected external device is external to the host system;
detecting second performance data of the first USB-connected external device over time when both the first USB-connected external device and the second USB-connected external device are connected to the host system;
calculating a second efficiency of the first USB-connected external device, based on the second performance data of the first USB-connected external device when both the first USB-connected external device the second USB-connected external device are connected to the host system, wherein the second efficiency is distinct from the second performance data;
calculating an interference quotient of the first USB-connected external device based on the first efficiency and the second efficiency; and
remediating interference between the first USB-connected external device and the second USB-connected external device, responsive to the interference quotient being in an unacceptable range.

8. The system of claim 7, wherein the remediating the interference comprises suggesting a first remedial action to a user, the first remedial action being directed to change the interference quotient.

9. The system of claim 8, the computer readable instructions further comprising:
maintaining an action table of remedial actions in rank order; and
identifying the first remedial action as a highest-ranked remedial action in the action table that has not yet been tried to change the interference quotient; wherein the remediating the interference comprises the first remedial action to a user, responsive to the first remedial action being the highest-ranked remedial action that has not yet been tried to change the interference quotient.

10. The system of claim 9, the computer readable instructions further comprising consulting a remote knowledgebase to determine which of the remedial actions in the action table have been tried to change the interference quotient.

11. The system of claim 8, wherein the first remedial action comprises at least one of: moving the first USB-connected external device, moving the second device, connecting the first USB-connected external device to an extension cable, connecting the second device to an extension cable, disconnecting the first USB-connected external device, and disconnecting the second device.

12. The system of claim 7, wherein calculating the interference quotient of the first USB-connected external device based on the first efficiency and the second efficiency comprises:
fitting a curve to a plurality of points representing efficiency of the first USB-connected external device when the second device is not connected to the host system and when the second device is connected to the host system; and
determining the interference quotient based on a characteristic of the curve.

13. A computer program product for detecting interference, the computer program product comprising a computer readable storage medium having program instructions embodied therewith, the program instructions executable by a processor to cause the processor to perform a method comprising:
detecting first performance data of a first USB-connected external device over time, wherein the first USB-connected external device is external to the host system;
calculating a first efficiency of the first USB-connected external device connected to the host system, based on the first performance data of the first USB-connected external device when a second USB-connected external device is not connected to the host system, wherein the first efficiency is distinct from the first performance data;
detecting connection of the second USB-connected external device to the host system while the first USB-connected external device is connected to the host system, wherein the second USB-connected external device is external to the host system;
detecting second performance data of the first USB-connected external device over time when both the first USB-connected external device and the second USB-connected external device are connected to the host system;
calculating a second efficiency of the first USB-connected external device, based on the second performance data of the first USB-connected external device when both the first USB-connected external device the second USB-connected external device are connected to the host system, wherein the second efficiency is distinct from the second performance data;
calculating an interference quotient of the first USB-connected external device based on the first efficiency and the second efficiency; and
remediating interference between the first USB-connected external device and the second USB-connected external device, responsive to the interference quotient being in an unacceptable range.

14. The computer program product of claim 13, wherein the remediating the interference comprises suggesting a first remedial action to a user, the first remedial action being directed to change the interference quotient.

15. The computer program product of claim 14, the method further comprising:
maintaining an action table of remedial actions in rank order; and
identifying the first remedial action as a highest-ranked remedial action in the action table that has not yet been tried to change the interference quotient; wherein the remediating the interference comprises the first remedial action to a user, responsive to the first remedial action being the highest-ranked remedial action that has not yet been tried to change the interference quotient.

16. The computer program product of claim 15, the method further comprising consulting a remote knowledgebase to determine which of the remedial actions in the action table have been tried to change the interference quotient.

17. The computer program product of claim 13, wherein calculating the interference quotient of the first USB-connected external device based on the first efficiency and the second efficiency comprises:
fitting a curve to a plurality of points representing efficiency of the first USB-connected external device when the second device is not connected to the host system and when the second device is connected to the host system; and determining the interference quotient based on a characteristic of the curve.

18. The computer program product of claim 14, wherein the first remedial action comprises at least one of: moving the first USB-connected external device, moving the second device, connecting the first USB-connected external device to an extension cable, connecting the second device to an extension cable, disconnecting the first USB-connected external device, and disconnecting the second device.

* * * * *